United States Patent
Kawashima et al.

(10) Patent No.: US 8,687,705 B2
(45) Date of Patent: Apr. 1, 2014

(54) MOVING PICTURE DECODING DEVICE AND MOVING PICTURE DECODING METHOD

(75) Inventors: Yuji Kawashima, Hamura (JP); Emi Maruyama, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 301 days.

(21) Appl. No.: 13/230,477

(22) Filed: Sep. 12, 2011

(65) Prior Publication Data

US 2012/0147968 A1    Jun. 14, 2012

(30) Foreign Application Priority Data

Dec. 13, 2010  (JP) ................................. 2010-277389

(51) Int. Cl.
*H04N 7/26* (2006.01)

(52) U.S. Cl.
USPC .................................................... 375/240.25

(58) Field of Classification Search
CPC ................................................ H04N 19/00206
USPC .................................................... 375/240.25
See application file for complete search history.

(56) References Cited

U.S. PATENT DOCUMENTS

| | | | |
|---|---|---|---|
| 2006/0227996 A1* | 10/2006 | Kunieda et al. | 382/100 |
| 2008/0273599 A1* | 11/2008 | Park et al. | 375/240.24 |
| 2008/0288518 A1* | 11/2008 | Matsuo et al. | 707/101 |
| 2009/0285564 A1 | 11/2009 | Kato et al. | |
| 2012/0155537 A1 | 6/2012 | Maruyama et al. | |

FOREIGN PATENT DOCUMENTS

| | | |
|---|---|---|
| JP | 2004-289745 | 10/2004 |
| JP | 2006-101404 | 4/2006 |
| JP | 2007-180982 | 7/2007 |
| JP | 2007-208476 | 8/2007 |
| JP | 2008-022475 | 1/2008 |
| JP | 2009-100071 | 5/2009 |
| JP | 2009-159466 | 7/2009 |
| WO | WO 2008-035665 | 3/2008 |

OTHER PUBLICATIONS

Japanese Patent Application No. 2010-277389, Notification of Reasons for Refusal, mailed Mar. 21, 2012, (with English Translation).
Japanese Patent Application No. 2010-277389, Notification of Reasons for Refusal, mailed Aug. 21, 2012, (with English Translation).
Japanese Patent Application No. 2010-277389, Notification of Reasons for Refusal, mailed Jan. 29, 2013, (with English Translation).
U.S. Appl. No. 13/230,456, Non Final Office Action, mailed Aug. 29, 2013.

* cited by examiner

*Primary Examiner* — Sath V Perungavoor
*Assistant Examiner* — Jeffery Williams
(74) *Attorney, Agent, or Firm* — Blakely, Sokoloff, Taylor & Zafman LLP (57) ABSTRACT

One embodiment provides a moving picture decoding device for decoding a compression-coded video stream, including: an inverse-quadrature-transformer/dequantizer configured to perform inverse-quadrature-transformation/dequantization processing on each frame to be decoded; a load detector configured to detect a magnitude of an apparatus processing load including a processing load for decoding; a judging module configured to judge whether the magnitude of the apparatus processing load detected by the load detecting module is small; and a controller configured to control the inverse-quadrature-transformer/dequantizer so as to skip at least part of the inverse-quadrature-transformation/dequantization processing if the judging module judges that the magnitude of the apparatus processing load is not small.

9 Claims, 11 Drawing Sheets

MOVING PICTURE DECODING DEVICE AND MOVING PICTURE DECODING METHOD

CROSS-REFERENCE TO RELATED APPLICATION(S)

This application claims priority from Japanese Patent Application No. 2010-277389 filed on Dec. 13, 2010, the entire contents of which are incorporated herein by reference.

FIELD

Embodiments described herein relate generally to a moving picture decoding device and a moving picture decoding method for decoding a multiview moving picture.

BACKGROUND

H.264/MVC which is an extended version of the H.264/AVC standard and relates to a multiview video coding scheme is employed in Blu-ray 3D. Whereas realizing a large compression ratio by performing inter-view prediction in addition to H.264/AVC inter prediction in motion compensation, in H.264/MVC, the amount of processing is large and increases in proportion to the number of view points, particularly when reproducing a high-resolution multiview picture as in the case of Blu-ray 3D.

On the other hand, theoretically, inter-view prediction provides a high correlation because pictures of the same time point and different view points are referred to. Pictures of adjoining viewpoints would be similar to each other in a large number of portions of a region concerned. Although it is desired to provide more efficient processing which employs inter-view prediction having such features in addition to a conventional deblocking technique, no means for realizing that desire is known.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

In general, one embodiment provides a moving picture decoding device for decoding a compression-coded video stream, including: an inverse-quadrature-transformer/dequantizer configured to perform inverse-quadrature-transformation/dequantization processing on each frame to be decoded; a load detector configured to detect a magnitude of an apparatus processing load including a processing load for decoding; a judging module configured to judge whether the magnitude of the apparatus processing load detected by the load detecting module is small; and a controller configured to control the inverse-quadrature-transformer/dequantizer so as to skip at least part of the inverse-quadrature-transformation/dequantization processing if the judging module judges that the magnitude of the apparatus processing load is not small.

Embodiments will be described.
(Embodiment 1)

A first embodiment will be described below with reference to FIGS. 1-4, and 11. The same elements will be given the same reference symbol and will not be described redundantly.

Figure 11:
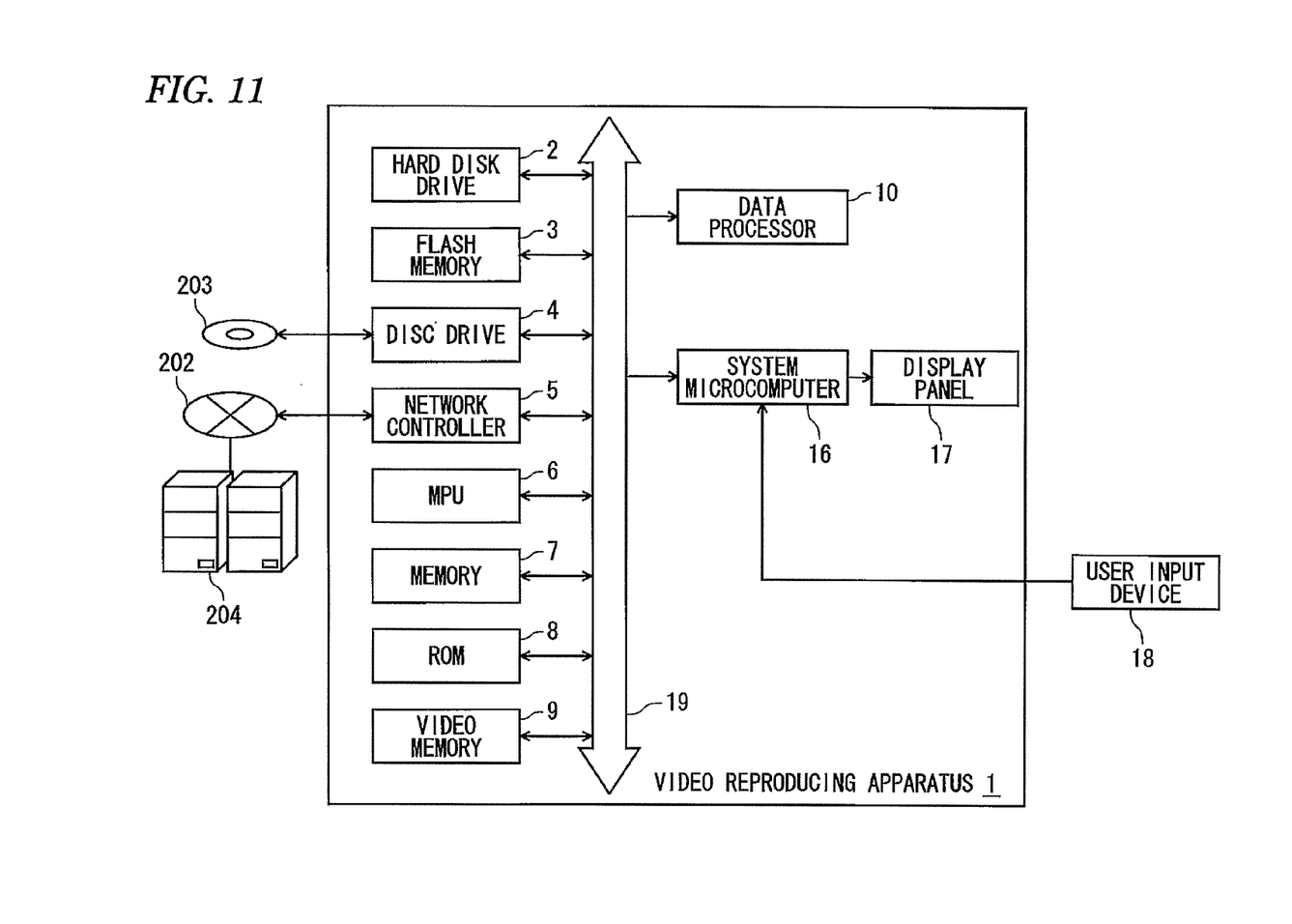
FIG. 11 illustrates a system configuration of a video reproducing apparatus which uses the moving picture decoding device according to the first embodiment, together with a recording medium and a network storage.

A moving picture decoding device 100 according to the embodiment is provided in a video reproducing apparatus 1 shown in FIG. 11. FIG. 11 illustrates a system configuration of the video reproducing apparatus 1 together with a recording medium 203 and a network storage 204. As shown in FIG. 11, the video reproducing apparatus 1 is configured to read digital video content data (data for reproduction of a video content such as a movie or a drama) from the recording medium 203 such as an optical disc and to reproduce its video content and interactive data (data to be reproduced in connection with the video content and including menu data, animation data, effect sound data, content commentary data (e.g., data of a commentary on the video content), quiz data, and other data). And the video reproducing apparatus 1 is configured to be connected to the network storage 204 via the Internet 202 and to obtain video content data also from the network storage 204 and to reproduce its video content and interactive data.

The video reproducing apparatus 1 includes a hard disk drive 2, a flash memory 3, a disc drive 4, and a network controller all of which are connected to a bus 19. The hard disk drive 2 writes and reads digital data such as video content data to and from a magnetic disk that is rotating at high speed.

Digital data such as video content data is written to and read from the flash memory 3. The disc drive 4 has a function of reading digital data such as video content data from the recording medium 203 and outputting a reproduction signal. The network controller 5 controls writing or reading of digital data such as video content data to or from the network storage 204 over the Internet 202.

The video reproducing apparatus 1 also includes an MPU (microprocessing unit) 6, a memory 7, a ROM 8, and a video memory 9 all of which are connected to the bus 19. Activated by an activation program read from the ROM 8 into the memory 7, the MPU 6 reads a player program from the ROM 8 into the memory 7, controls system initialization, system ending, etc. and processing of a system microcomputer 16 according to the player program. Furthermore, the MPU 6 instructs a data processor 10 (described later) to reproduce video and audio based on video content data that is read from one of the recording medium 203, the network storage 204, the hard disk drive 2, and the flash memory 3. The memory 7 stores data and a program to be used when the MPU 6 operates. The ROM 8 is stored with programs to be run by the MPU 6 such as the activation program and the player program, programs (e.g., a video reproduction program for reproducing video and audio by decoding a compression-coded moving picture/audio data such as video content data) to be run by the data processor 10, permanent data, etc. Decoded picture data D (described later) are written to the video memory 9 sequentially.

Operating according to the video reproduction program, the data processor 10 separates compression-coded moving picture/audio data into moving picture data and audio data, decoding them, and reproduces video and audio. The system microcomputer 16 causes a display panel 17 to display reproduction information of a video content, and inputs, to the MPU 6, via the bus 19, a manipulation input signal that is input from a user input device 18 (a remote controller or a device such as manipulation buttons that is provided in the video reproducing apparatus 1 and enables manipulation input). The display panel 17 displays, on its liquid crystal display panel, various kinds of information relating to reproduction of a video content and interactive data according to instructions from the system microcomputer 16.

Figure 2:
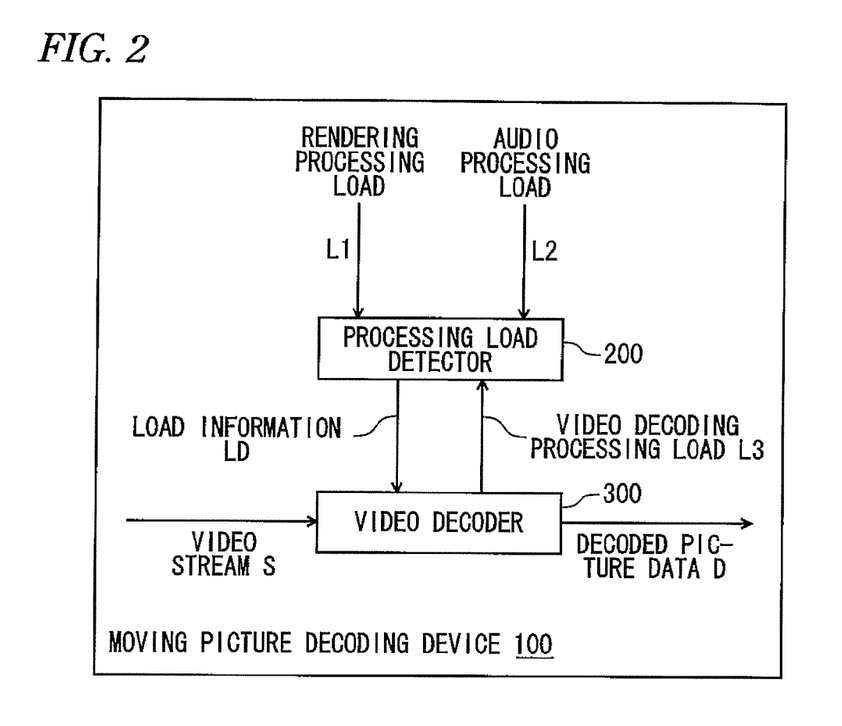
FIG. 2 illustrates a block configuration of a moving picture decoding device according to the first embodiment which includes the video decoder and a processing load detector.

FIG. 2 illustrates a block configuration of the moving picture decoding device 100 which is provided in the video reproducing apparatus 1. The moving picture decoding device 100 is a software decoder which is realized by a moving picture decoding processing program which is one module of the video reproduction program. The moving picture decoding processing program is software for decoding moving picture data S (e.g., video content data; hereinafter referred to as "video stream") which is compression-coded by a coding method specified in the H.264/MVC standard. The moving picture decoding processing program is run by the data processor 10, and has functions corresponding to a processing load detector (a processing load detecting module of the moving picture decoding processing program) 200 and a video decoder (a decoding execution module of the moving picture decoding processing program) 300 shown in FIG. 2.

The processing load detector 200 has a function of a load detector which detects magnitudes of various processing loads (hereinafter referred to as "apparatus processing loads") occurring in the video reproducing apparatus 1 that include a decoding processing load of the video decoder 300. In the embodiment, the apparatus processing loads to be detected are a rendering processing load L1 of rendering for visualizing reproduced video data and generating a picture to be displayed, an audio processing load L2 of audio outputting, and a video decoding processing load L3 of decoding that is performed by the video decoder 300. For example, a magnitude of each processing load (load amount) is determined based on a use rate of the MPU 6 (or data processor 10). Alternatively, it may be determined based on a combination of a use rate of the MPU 6 and a use rate of the ROM 8.

To allow smooth operation of a software decoder, usually a memory (e.g., ROM 8) having a size that is larger than a predetermined size is necessary. The performance of the software decoder lowers as the use rate of the memory increases. Therefore, detecting a magnitude of a total apparatus processing load based on a combination a use rate of the MPU 6 (or data processor 10) and a use rate of the ROM 8 makes it possible to accurately judge whether or not the load amount adversely affects smooth operation of the software decoder.

The processing load detector 200 generates load information LD indicating a detected magnitude of a total apparatus processing load and inputs it to the video decoder 300. The load information LD is used by the video reproducing apparatus 1 to judge whether or not the load amount adversely affects the execution of the decoding processing of the video decoder 300 (this state is called "heavy load state" described later).

As described later in detail, the video decoder 300 receives a video stream S and outputs decoded picture data D by decoding (expanding) it and performing other processing. Although not shown in FIG. 2, the decoded picture data D is subjected to combining processing. A video output signal corresponding to resulting combined picture data is output from the video reproducing apparatus 1.

Figure 1:
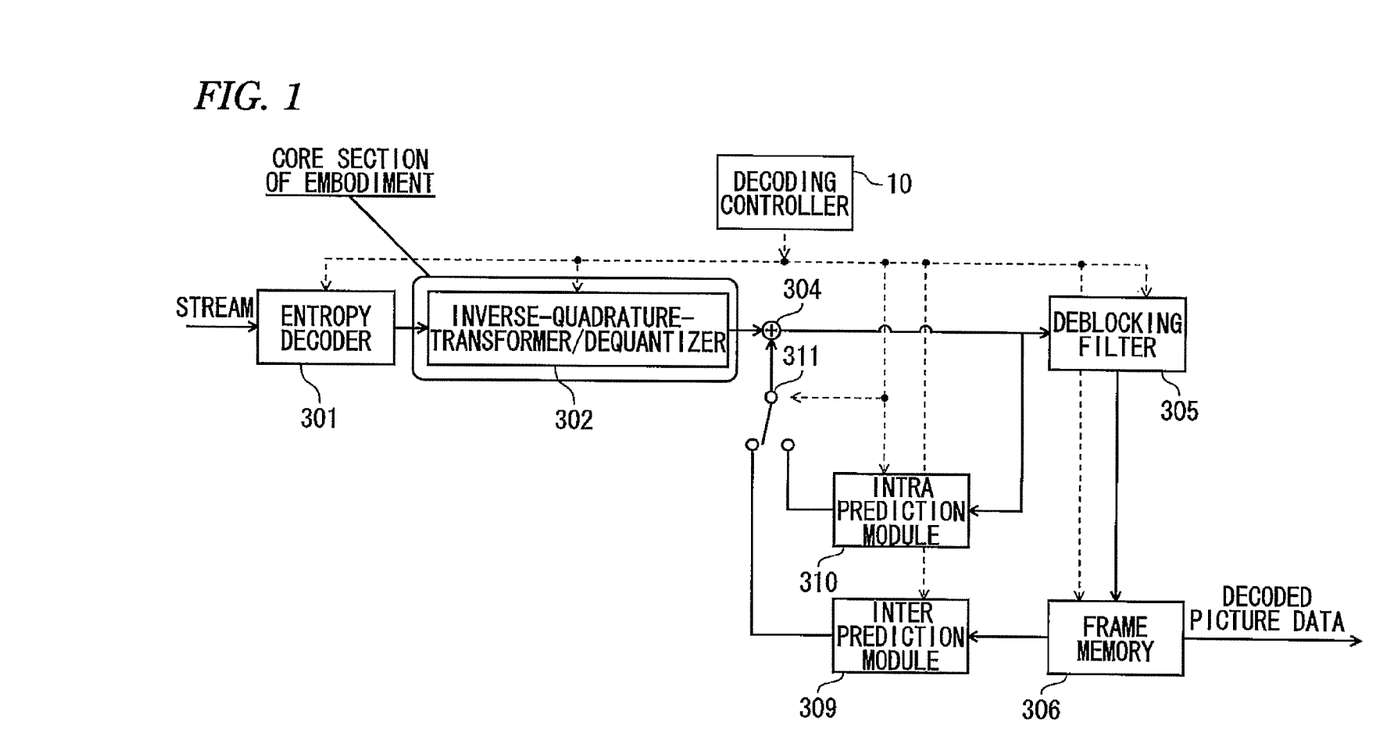
FIG. 1 illustrates a block configuration of an H.264/MVC video decoder used in a first embodiment which includes a core section of the embodiment.

Next, the video decoder 300 will be described with reference to FIG. 1. As shown in FIG. 1, the video decoder 300, which complies with the H.264/MVC standard, includes an entropy decoder 301, an inverse-quadrature-transformer (for performing inverse DCT (discrete cosine transform))/dequantizer 302, an adder 304, a deblocking filter 305, a frame memory 306, an inter prediction module 309 which performs motion vector prediction, interpolation prediction, and weighting prediction, an intra prediction module 310, and a mode changeover switch 311. Although the H.264 quadrature transformation is of integer precision and hence is different from conventional DCT, in the embodiment it is regarded as DCT.

The video decoder 300 divides each frame (picture) of a video stream S into macroblocks, for example, and performs decoding on a macroblock-by-macroblock basis. Each macroblock consists of 16 blocks, for example, and each block includes 16 (4×4) pixels.

Each macroblock is decoded while one of an intra coding mode and a motion compensated inter prediction coding-mode (inter coding mode) is selected for it.

In the intra coding mode, an intra prediction signal has been generated from an already coded signal of a coding subject frame in units of a predetermined shape. A prediction residual obtained by subtracting the intra prediction signal from the coding subject frame has been coded by quadrature transformation (DCT), quantization, and entropy coding. In the motion compensated inter prediction coding mode, a motion compensated inter prediction signal has been generated in units of a predetermined shape. The motion compensated inter prediction signal has been generated to detect, as a variation component, only portions that are different froma coded frame and estimates motion using those portions. A prediction residual obtained by subtracting the motion compensated inter prediction signal from a coding subject frame has been coded by quadrature transformation (DCT), quantization, and entropy coding.

Codecs that comply with the H.264/AVC standard which is the predecessor of the H.264/MVC standard employ the following techniques (1)-(6) and other techniques to increase compression ratio.

(1) Motion compensation of higher pixel precision (¼-pixel precision) than in the conventional MPEG standard (2) Intra prediction for performing intra-frame coding efficiently (3) A deblocking filter for reducing block distortion (4) Integer DCT performed in units of 4×4 pixels (5) Multi-reference frames which enable use of plural frames located at arbitrary positions as reference frames (6) Weighted prediction Next, a description will be made of how the video decoder 300 shown in FIG. 1 which is a software decoder operates. First, a video stream S is input to the entropy decoder 301. The video stream S contains, in addition to coded moving picture data, such information as motion vector information that was used in motion compensated inter prediction coding (inter prediction coding), intra prediction information that was used in intra prediction coding, and mode information indicating a prediction mode (inter prediction coding or intra prediction coding).

The entropy decoder 301 performs entropy decoding processing such as variable-length decoding on the video stream S and thereby outputs quantized DCT coefficients, motion vector information, the motion vector information, the intra prediction information, and the mode information in such a manner that they are separated from each other. In this processing, for example, each macroblock within a decoding subject frame is processed by the entropy decoder 301 on a block-by-block basis. And each block is converted into 4×4 quantized DCT coefficients (the following description will be made with an assumption that each block consists of 4×4 pixels). Each block may consist of 8×8 pixels.

Among the data that are output from the entropy decoder 301, the motion vector information is input to the inter prediction module 309 and the intra prediction information is input to the intra prediction module 310. The mode information is input to the mode changeover switch 311.

The inverse-quadrature-transformer/dequantizer 302 converts 4×4 quantized DCT coefficients of a decoding subject block into 4×4 DCT coefficients (quadrature transformation coefficients) by performing dequantization processing. Furthermore, the inverse-quadrature-transformer/dequantizer 302 converts the 4×4 DCT coefficients (frequency information) into 4×4 pixel values by performing inverse DCT (inverse quadrature transformation) processing. The 4×4 pixel values are a prediction residual corresponding to the decoding subject block. The prediction residual is input to the adder 304. The adder 304 adds a prediction signal (motion compensated inter prediction signal or intra prediction signal) corresponding to the decoding subject block to the received prediction residual. The 4×4 pixel values corresponding to the decoding subject block is decoded in this manner.

As described above, in the video decoder 300, the processing of decoding a decoding subject frame on a block-by-block basis by adding a prediction signal (motion compensated inter prediction signal or intra prediction signal) to a prediction residual corresponding to the decoding subject block is performed.

In the intra prediction mode, the intra prediction module 310 is selected by the mode changeover switch 311 and hence an intra prediction signal that is output from the intra prediction module 310 is added to a prediction residual. In the inter prediction mode, the inter prediction module 309 is selected by the mode changeover switch 311 and hence a motion compensated inter prediction signal that is obtained by motion vector prediction, interpolation prediction, and weighting prediction is added to a prediction residual.

Each decoded frame is subjected to deblocking filter processing in the deblocking filter 305. The deblocking filter 305 performs deblocking filter processing for reducing block noise on each decoded frame on a block-by-block basis, each block consisting of 4×4 pixels, for example. Subjects of the deblocking filter processing are boundaries (edges), having a continuity breaking step, between neighboring blocks of a macroblock. The deblocking filter processing smoothes each such boundary by eliminating such a step. Not all of the boundaries between the blocks are subjected to the deblocking filter processing; only boundaries that should be smoothed, that is, only boundaries whose steps should be eliminated, are subjected to the deblocking filter processing.

The deblocking filter processing prevents an event that block distortion is included in a reference picture and thereby transferred to a decoded picture. The deblocking filter processing of the deblocking filter 305 is performed adaptively in such a manner that strong filter processing is performed on portions where block distortion tends to occur and weak filter processing is performed on portions where block distortion is not prone to occur. The deblocking filter processing is realized as loop filter processing.

Each frame that has been subjected to the deblocking filter processing is stored in the frame memory 306, and is read from the frame memory 306 as a decoded picture (output frame or output picture field).

Each frame (reference frame) to be used as a reference picture for motion compensated inter prediction is stored in the frame memory 306 for a prescribed period. In the case of motion compensated inter prediction coding of the H.264/MVC standard in which plural frames can be used as reference pictures (multi-reference frames), the frame memory 306 has plural memory units for storing plural frames.

A motion vector prediction module of the inter prediction module 309 generates motion vector difference information based on motion vector information corresponding to a decoding subject block. An interpolation prediction module generates a motion compensated inter prediction signal based on integer precision pixels and ¼-pixel precision prediction interpolation pixels in a reference frame using the motion vector difference information corresponding to the decoding subject block. A 6-tap filter (having six inputs and one output) is used for generating a ¼-pixel precision prediction interpolation pixel, which enables high-accuracy prediction interpolation processing in which even high-frequency components are taken into consideration. However, the motion compensation requires a larger processing amount.

The inter prediction module 309 generates a weighted motion compensated inter prediction signal by performing processing (weighting prediction) of multiplying the motion compensated inter prediction signal by weight coefficients for each motion compensated block. The weighting prediction processing is processing of predicting brightness of the decoding subject frame. The weighting prediction processing can improve the quality of a moving picture whose brightness varies with time as in the case of fade-in or fade-out. However, the processing amount of the video decoder 300 is increased accordingly.

The intra prediction module 310 generates, based on a decoding subject frame, an intra prediction signal of a decoding subject block included in the decoding subject frame. The intra prediction module 310 generates an intra prediction signal based on pixel values of other, already decoded blocks close to the decoding subject block within the same frame by performing intra prediction processing according to intra prediction information that is input from the entropy decoder 301. The intra prediction is a technique for increasing the compression ratio utilizing pixel correlations between blocks. In the intra prediction, one of four prediction modes, that is, vertical prediction (prediction mode-0), horizontal prediction (prediction mode-1), average prediction (prediction mode-3), and plane prediction (prediction mode-4), is selected for each intra prediction block (e.g., 16×16 pixels) according to the intra prediction information. Whereas the probability that the plane prediction is selected is lower than the probabilities that the other intra prediction modes are selected, the plane prediction requires a more processing amount than any other intra prediction mode.

Figure 4:
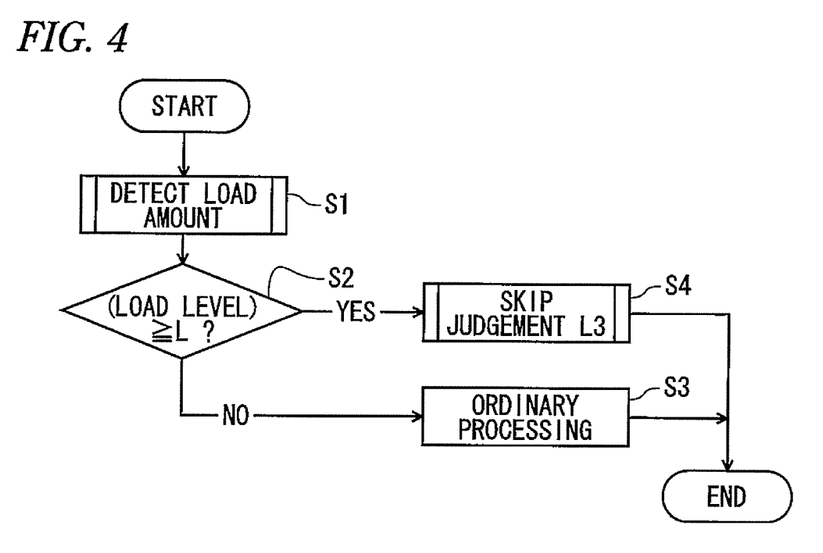
FIG. 4 illustrates a skip judgment for the inverse-quadrature-transformation/dequantization according to the first embodiment.

In the moving picture decoding device 100 according to the embodiment, to make it possible to decode a video stream S in real time in a time limit even if the apparatus processing load is increased, selection is made between ordinary decoding processing which is all of the above-described pieces of decoding processing including the processing of the inversequadrature-transformer/dequantizer 302 and special decoding processing which is the ordinary decoding processing excluding part of the processing of the inverse-quadrature-transformer/dequantizer 302 according to FIG. 4.

Figure 3:
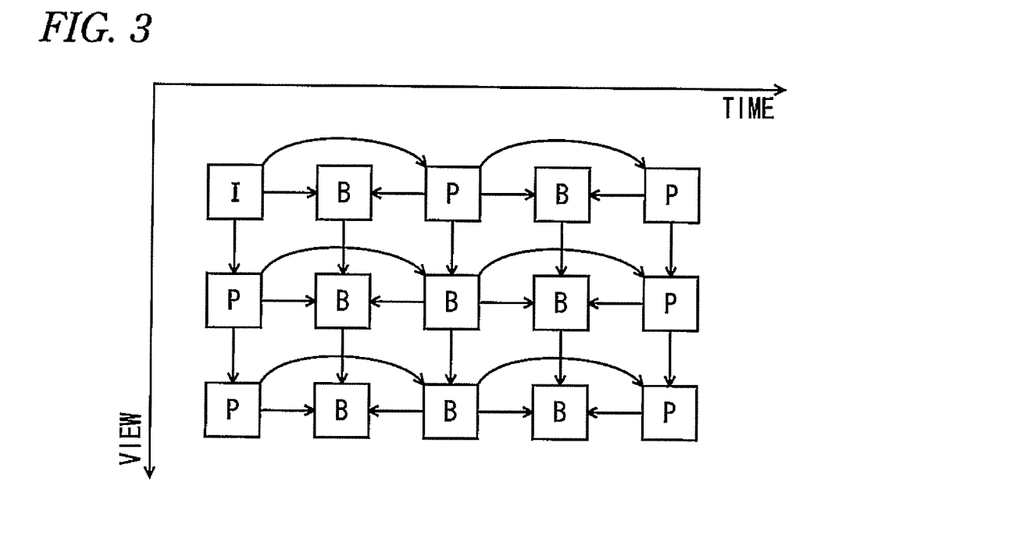
FIG. 3 illustrates H.264/MVC inter-view prediction used in the first embodiment.

In the multiview video coding scheme H.264/MVC, as shown in FIG. 3, the coding efficiency is increased by performing inter-view prediction (indicated by downward arrows) in which a frame having a different view is referred to in addition to inter prediction (indicated by horizontal arrows) in which frames having the same view are referred to. The inter-view prediction should provide a high correlation because pictures of the same time point and different view points are referred to. Pictures of adjoining view points would be similar to each other in a large number of portions of a region concerned. Therefore, both of image quality degradation and the decoding processing amount can be reduced by performing the decoding processing that excludes the inverse-quadrature-transformation/dequantization processing on blocks to be decoded by using the inter-view prediction when the following condition is satisfied.

As shown in FIG. 4, the decoding processing that excludes part of the inverse-quadrature-transformation/dequantization processing is performed if a load level that is determined from a processing amount detected at a certain time point is higher than or equal to a prescribed value L and the block concerned is to be subjected to the inter-view prediction. If not, the ordinary decoding processing is performed.

A load amount may be detected (i.e., a judgment for switching between the ordinary decoding and the special decoding may be made) in units of any of a block, a macroblock, a slice, a picture, and a sequence (IDR).

The operation procedure of a decoding process which is executed by the moving picture decoding device 100 will be described with reference to FIG. 4. When the decoding process is executed according to FIG. 4, the data processor 10 runs the moving picture decoding processing program and operates as a controller of the embodiment.

Upon a start of the decoding process of the moving picture decoding processing program, at step S1 the data processor 10 inquires a current load of the video reproducing apparatus 1. The processing load detector 200 detects a magnitude of the apparatus processing load based on, for example, a use rate of the data processor 10, and load information LD is input to the video decoder 300.

At step S2, the data processor 10 judges, based on the load information LD received at step S1, whether or not the video reproducing apparatus 1 is in a heavy load state by judging whether or not the current load of the video reproducing apparatus 1 is heavier than or equal to a prescribed reference value L.

If it is judged that the video reproducing apparatus 1 is not in a heavy load state, the process moves to step S3. In this case, the data processor 10 performs the ordinary decoding processing, that is, all of the above-described pieces of decoding processing including the processing of the inverse-quadrature-transformer/dequantizer 302. Therefore, a video stream S is decoded by the ordinary decoding processing unless the video reproducing apparatus 1 is rendered in a heavy load state, that is, the decoding performance is lowered.

On the other hand, if it is judged that the video reproducing apparatus 1 is in a heavy load state, the process moves to step S4. In this case, the data processor 10 performs the special decoding processing, that is, the above-described pieces of decoding processing excluding part of the processing of the inverse-quadrature-transformer/dequantizer 302.

Skipping part of the processing of the inverse-quadrature-transformer/dequantizer 302 in the above-described manner makes it possible to greatly reduce the amount of processing that is necessary for decoding of each frame. Therefore, even if the video reproducing apparatus 1 is rendered in a heavy load state because of running of another program during execution of decoding processing, such trouble as loss of a frame or extremely slow motion of an object can be prevented. Decoding and reproduction of a moving picture can thus be continued smoothly.

(Embodiment 2)

A second embodiment will be described below with reference to FIG. 5-9. Units, modules, etc. having the corresponding ones in the first embodiment will not be described in detail.

Figure 5:
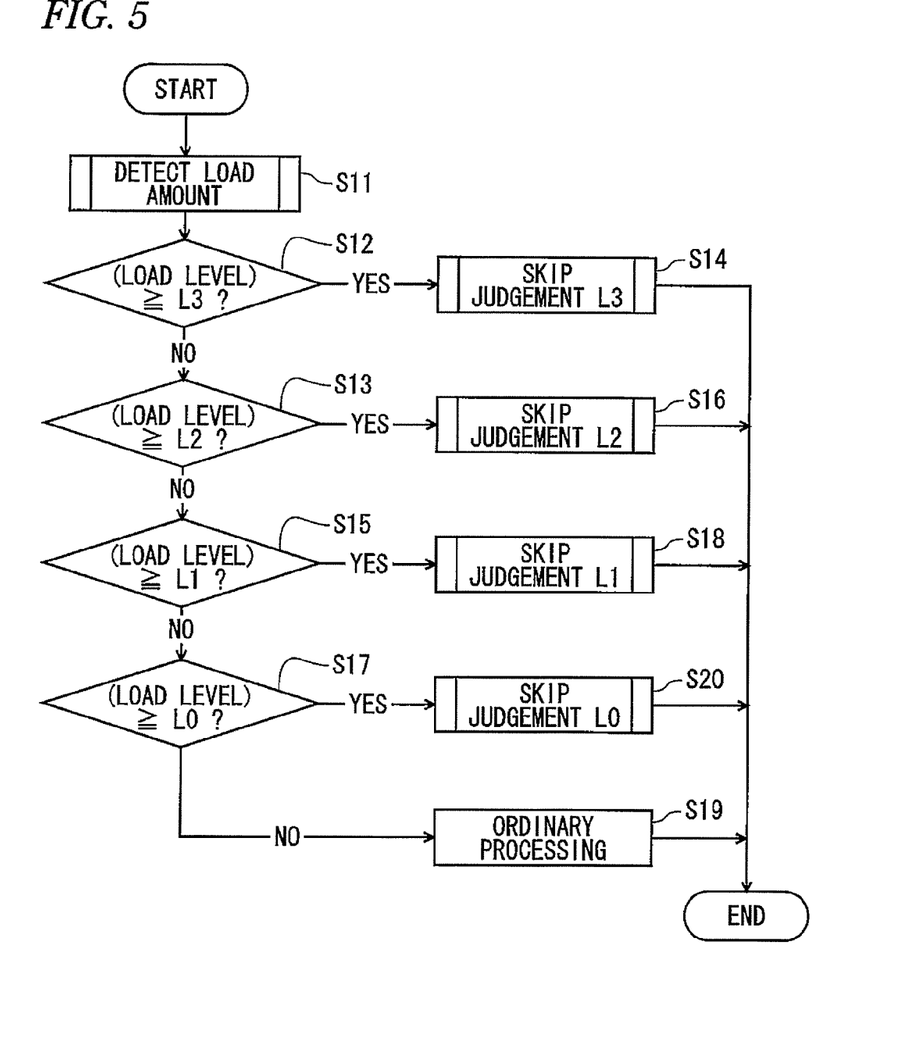
FIG. 5 illustrates a skip judgment for the inverse-quadrature-transformation/dequantization according to a second embodiment.

The second embodiment is different from the first embodiment (FIG. 4) in that as shown in FIG. 5 a skip judgment process is performed using a combination of a load level and a coding state. Furthermore, as shown in FIGS. 6-9, the coding state judging method is changed stepwise depending on the load level.

For example, the following four coding state judgment criteria are employed. And the number of criteria to be satisfied is changed according to the load level.

(1) Inter-view prediction was used for the block concerned.
(2) A reference picture of the block concerned is the same as reference pictures of neighboring blocks.
(3) A motion vector of the block concerned is the same as motion vectors of neighboring blocks.
(4) Neighboring blocks have no residual signals.

As the load level becomes higher, the number of criteria to be satisfied is decreased, that is, skipping is made more likely to occur. (As the load level becomes lower, the number of criteria to be satisfied is increased, that is, skipping is made less likely to occur.) This makes it possible to lower the decoding load while minimizing image quality degradation due to skipping.

The operation procedure of a decoding process which is executed by the moving picture decoding device 100 will be described with reference to FIG. 5. When the decoding process is executed according to FIG. 5, the data processor 10 runs the moving picture decoding processing program and operates as a controller of the embodiment.

Upon a start of the decoding process of the moving picture decoding processing program, at step S11 the data processor 10 inquires a current load of the video reproducing apparatus 1. The processing load detector 200 detects a magnitude of the apparatus processing load based on, for example, a use rate of the data processor 10, and load information LD is input to the video decoder 300.

At step S12, the data processor 10 judges, based on the load information LD received at step S11, whether or not the video reproducing apparatus 1 is in a heavy load state by judging whether or not the current load of the video reproducing apparatus 1 is heavier than or equal to a prescribed reference value L3.

If it is judged that the video reproducing apparatus 1 is in a heavy load state, the process moves to step S14. In this case, the data processor 10 executes a skip judgment process L3 process (described later) as the decoding process. The special decoding processing, that is, all of the above-described pieces of decoding processing of the video decoder 300 excluding part of the processing of the inverse-quadrature-transformer/dequantizer 302 is performed at step S22 (see FIG. 6).

On the other hand, if it is judged that the video reproducing apparatus 1 is not in a heavy load state, the process moves to step S13. In the case, the data processor 10 judges, based on the load information LD received at step S11, whether or not the video reproducing apparatus 1 is in a heavy load state by judging whether or not the current load of the video reproducing apparatus 1 is heavier than or equal to a prescribed reference value L2.

If it is judged that the video reproducing apparatus 1 is in a heavy load state, the process moves to step S16. In this case, the data processor 10 executes a skip judgment process L2 process (described later) as the decoding process. The special decoding processing, that is, all of the above-described pieces of decoding processing of the video decoder 300 excluding part of the processing of the inverse-quadrature-transformer/dequantizer 302 is performed at step S33 (see FIG. 7).

On the other hand, if it is judged that the video reproducing apparatus 1 is not in a heavy load state, the process moves to step S15. In the case, the data processor 10 judges, based on the load information LD received at step S11, whether or not the video reproducing apparatus 1 is in a heavy load state by judging whether or not the current load of the video reproducing apparatus 1 is heavier than or equal to a prescribed reference value L1.

If it is judged that the video reproducing apparatus 1 is in a heavy load state, the process moves to step S18. In this case, the data processor 10 executes a skip judgment process L1 process (described later) as the decoding process. The special decoding processing, that is, all of the above-described pieces of decoding processing of the video decoder 300 excluding part of the processing of the inverse-quadrature-transformer/dequantizer 302 is performed at step S44 (see FIG. 8).

On the other hand, if it is judged that the video reproducing apparatus 1 is not in a heavy load state, the process moves to step S17. In the case, the data processor 10 judges, based on the load information LD received at step S11, whether or not the video reproducing apparatus 1 is in a heavy load state by judging whether or not the current load of the video reproducing apparatus 1 is heavier than or equal to a prescribed reference value L0.

If it is judged that the video reproducing apparatus 1 is in a heavy load state, the process moves to step S20. In this case, the data processor 10 executes a skip judgment process L0 process (described later) as the decoding process. The special decoding processing, that is, all of the above-described pieces of decoding processing of the video decoder 300 excluding part of the processing of the inverse-quadrature-transformer/dequantizer 302 is performed at step S55 (see FIG. 9).

On the other hand, if it is judged that the video reproducing apparatus 1 is not in a heavy load state, the process moves to step S17. In the case, the data processor 10 performs the ordinary decoding processing, that is, all of the above-described pieces of decoding processing including the processing of the inverse-quadrature-transformer/dequantizer 302. Therefore, a video stream S is decoded by the ordinary decoding processing unless the video reproducing apparatus 1 is rendered in a heavy load state, that is, the decoding performance is lowered.

Figure 6:
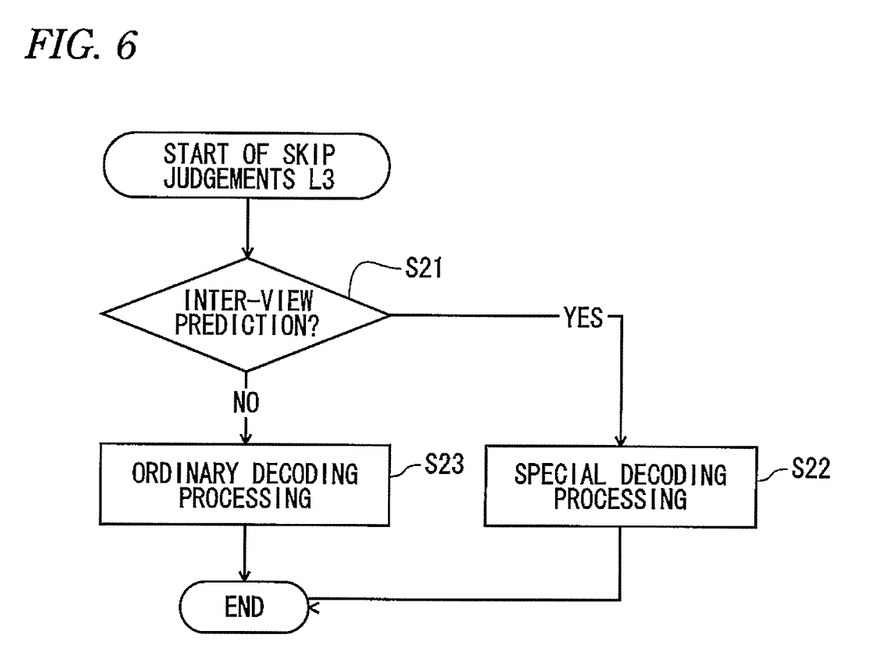
FIG. 6 illustrates skip judgments L3 in FIG. 5.

The operation procedure of the skip judgment L3 process which is executed by the moving picture decoding device 100 will be described below with reference to FIG. 6.

At step S21, the data processor 10 judges whether or not inter-view prediction was used the block concerned. If inter-view prediction was used, at step S22 the special decoding processing without part of the inverse-quadrature-transformation/dequantization processing is performed. If not, the ordinary decoding processing is performed at step S23.

Figure 7:
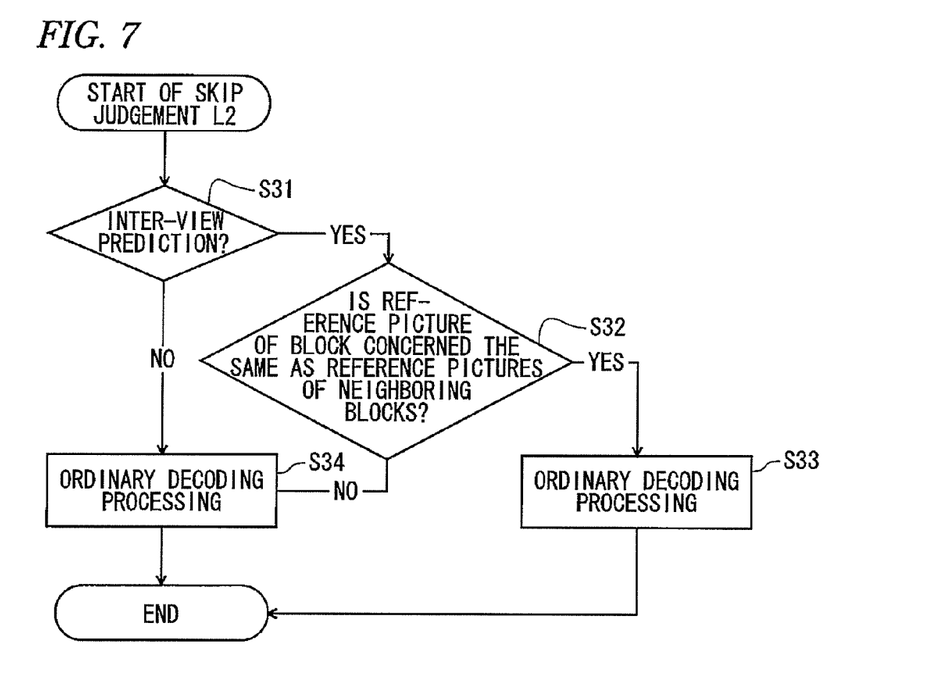
FIG. 7 illustrates a skip judgment L2 in FIG. 5.

The operation procedure of the skip judgment L2 process which is executed by the moving picture decoding device 100 will be described below with reference to FIG. 7.

If it is judged at step S31 that inter-view prediction was used for the block concerned, the process moves to step S32. If it is judged at step S32 that a reference picture of the block concerned is the same as reference pictures of neighboring blocks, the process moves to step S33, where the special decoding processing without part of the inverse-quadrature-transformation/dequantization processing is performed.

If the judgment result of step S32 is negative, the process moves to step S34, where the ordinary decoding processing is performed.

Figure 8:
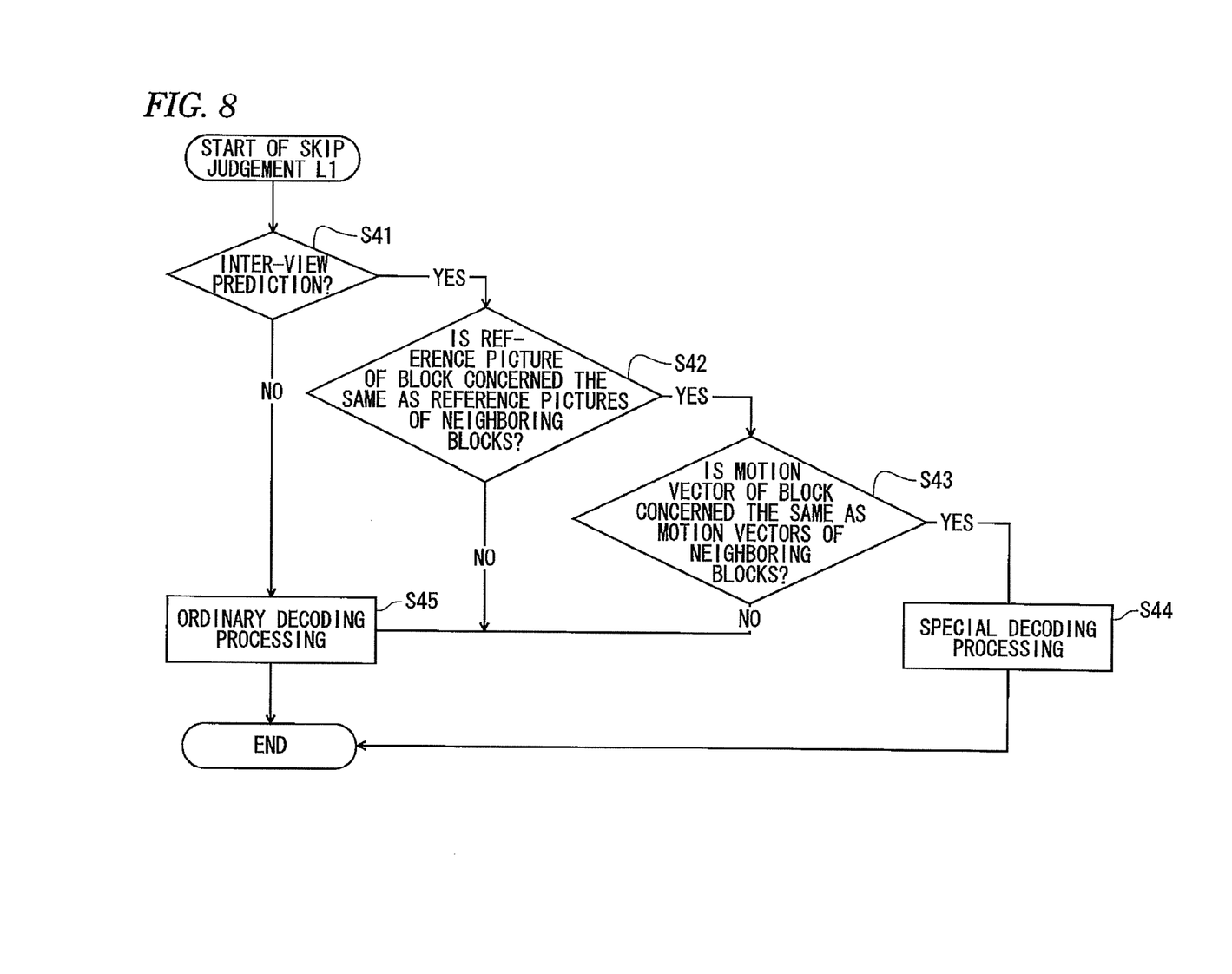
FIG. 8 illustrates a skip judgment L1 in FIG. 5.

The operation procedure of the skip judgment L1 process which is executed by the moving picture decoding device 100 will be described below with reference to FIG. 8.

If it is judged at step S41 that inter-view prediction was used for the block concerned, the process moves to step S42. If it is judged at step S42 that a reference picture of the block concerned is the same as reference pictures of neighboring blocks, the process moves to step S43. If it is judged at step S43 that emotion vector of the block concerned is the same as motion vectors of the neighboring blocks, the process moves to step S44, where the special decoding processing without part of the inverse-quadrature-transformation/dequantization processing is performed.

If the judgment result of step S43 is negative, the process moves to step S45, where the ordinary decoding processing is performed.

Figure 9:
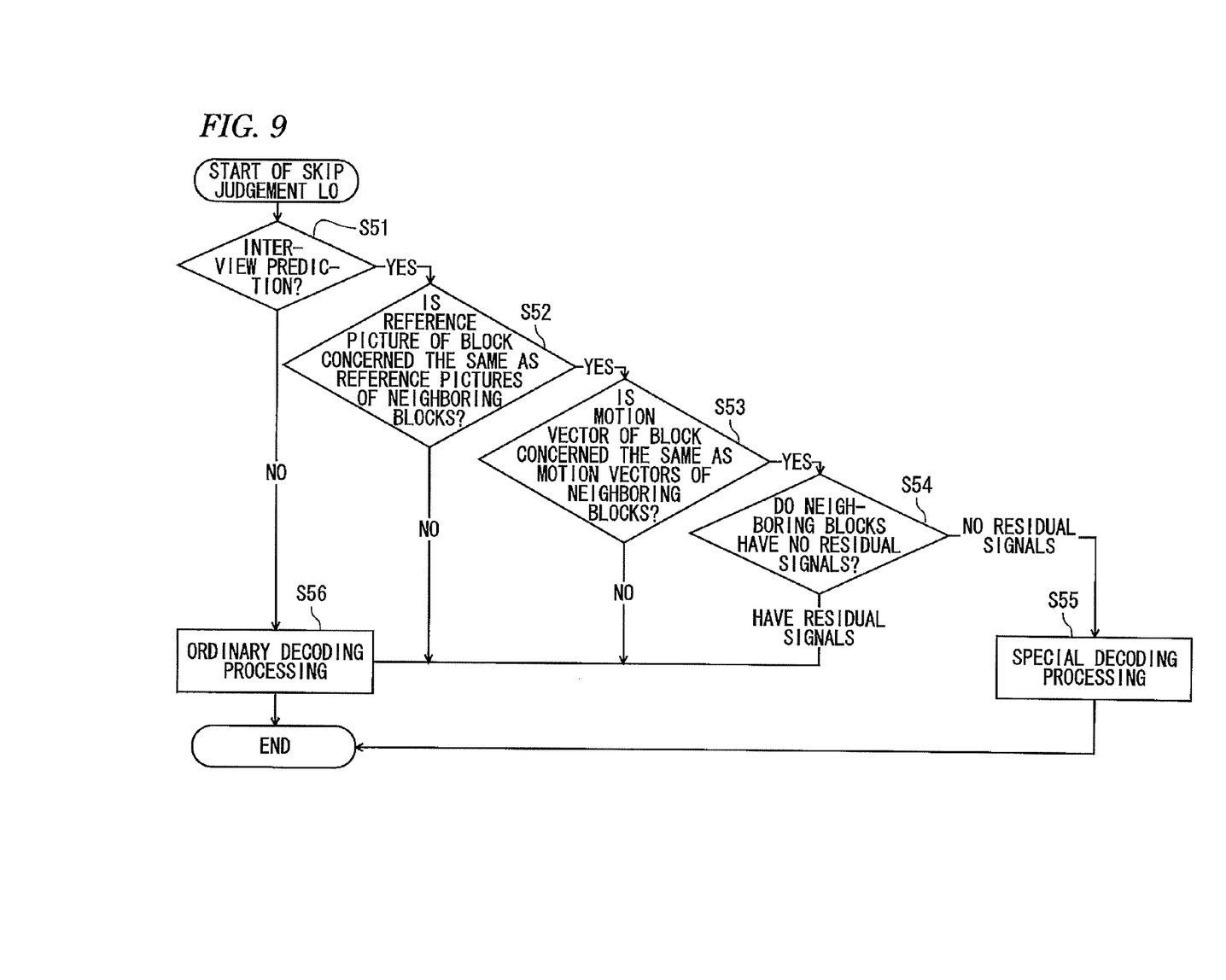
FIG. 9 illustrates a skip judgment L0 in FIG. 5.

The operation procedure of the skip judgment L0 process which is executed by the moving picture decoding device 100 will be described below with reference to FIG. 9.

If it is judged at step S51 that inter-view prediction was used for the block concerned, the process moves to step S52. If it is judged at step S52 that a reference picture of the block concerned is the same as reference pictures of neighboring blocks, the process moves to step S53. If it is judged at step S53 that a motion vector of the block concerned is the same as motion vectors of the neighboring blocks, the process moves to step S54. If it is judged at step S54 that the neighboring blocks have no residual signals, the process moves to step S55, where the special decoding processing without part of the inverse-quadrature-transformation/dequantization processing is performed.

If it is judged at step S54 that the neighboring blocks have residual signals, the process moves to step S56, where the ordinary decoding processing is performed.

(Embodiment 3)

A third embodiment will be described below with reference to FIGS. 1-4 and 10. Units, modules, etc. having the corresponding ones in the first or second embodiment will not be described in detail.

Figure 10:
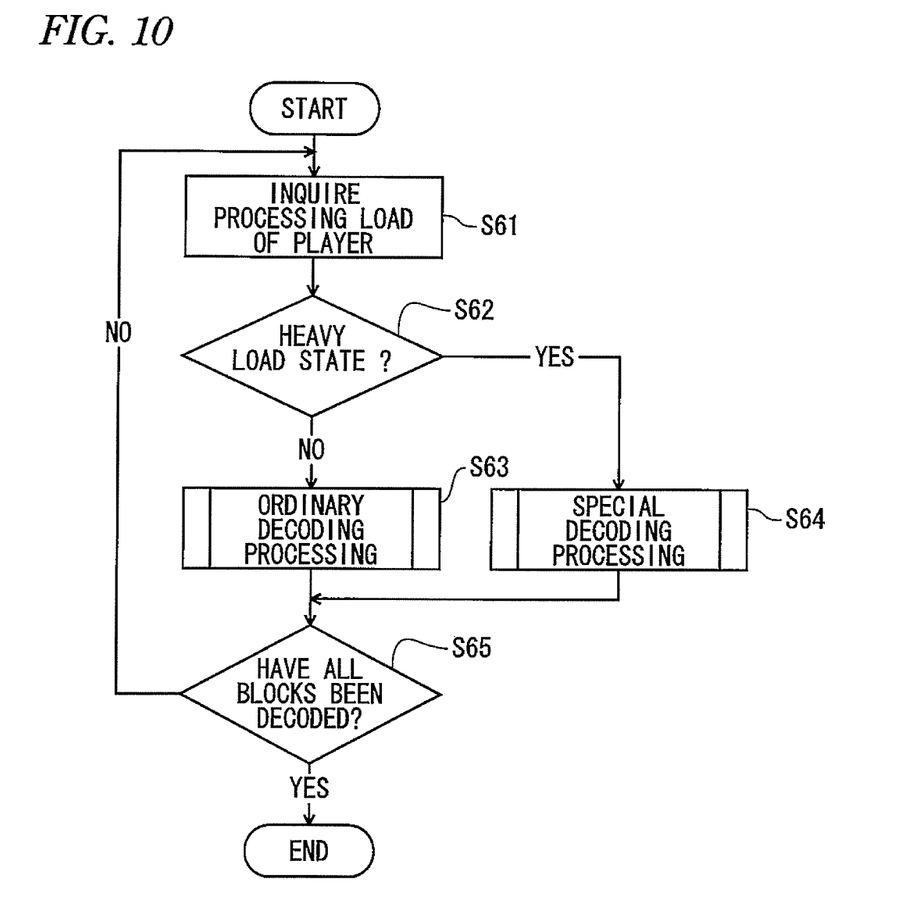
FIG. 10 illustrates a decoding process which is executed by a player according to a third embodiment.

The operation procedure of a decoding process which is executed by the video reproducing apparatus 1 (player) will be described with reference to FIG. 10. When the decoding process is executed according to FIG. 10, the data processor 10 runs the moving picture decoding processing program and operates as a controller of the embodiment.

Upon a start of the decoding process of the moving picture decoding processing program, at step S61 the data processor 10 inquires a current load of the video reproducing apparatus 1. The processing load detector 200 detects a magnitude of the apparatus processing load based on, for example, a use rate of the data processor 10, and load information LD is input to the video decoder 300.

At step S62, the data processor 10 judges, based on the load information LD received at step S61, whether or not the video reproducing apparatus 1 is in a heavy load state by judging whether or not the current load of the video reproducing apparatus 1 is heavier than or equal to a prescribed reference value L.

If it is judged that the video reproducing apparatus 1 is not in a heavy load state, the process moves to step S63. In this case, the data processor 10 performs the ordinary decoding processing, that is, all of the above-described pieces of decoding processing including the processing of the inverse-quadrature-transformer/dequantizer 302. Therefore, a video stream S is decoded by the ordinary decoding processing unless the video reproducing apparatus 1 is rendered in a heavy load state, that is, the decoding performance is lowered.

On the other hand, if it is judged that the video reproducing apparatus 1 is in a heavy load state, the process moves to step S64. In this case, the data processor 10 performs the special decoding processing, that is, the above-described pieces of decoding processing excluding part of the processing of the inverse-quadrature-transformer/dequantizer 302.

Upon execution of step S63 or S64, the process moves to step S65. It is judged at step S65 that all blocks have been decoded. If not all blocks have been decoded, the process returns to step S61. If all blocks have been decoded, the process is finished.

Skipping part of the processing of the inverse-quadrature-transformer/dequantizer 302 in the above-described manner makes it possible to greatly reduce the amount of processing that is necessary for decoding of each frame. Therefore, even if the video reproducing apparatus 1 is rendered in a heavy load state because of running of another program during execution of decoding processing, such trouble as loss of a frame or extremely slow motion of an object can be prevented. Decoding and reproduction of a moving picture can thus be continued smoothly.

In the above-described embodiments, attention is paid to similarity between pictures that are subjected to inter-view prediction. The processing amount of the decoder is reduced by skipping decoding and addition processing for prediction residual signals in decoding a picture using inter-view prediction. This processing amount reduction processing is not performed all the time but only when the load is heavy (loads of various kinds of processing performed by the player are detected). Image quality degradation is thus minimized.

The above-described embodiments provide an advantage that the power consumption can be reduced and real-time decoding of a multiview moving picture which requires an enormous amount of processing can be realized in AV equipment by skipping part of the processing of a video decoder according to the load of a processor or the residual capacity of a battery.

In the device for decoding a moving picture (see FIG. 1), the following pieces of processing are performed to reduce the processing amount of decoding:

(1) The processing load detector detects a total processing load from a processing load of the video decoder and loads of other kinds of processing such as audio processing and rendering processing. The video decoder may perform simplified processing according to resulting load information (see FIG. 2).

(2) If simplified processing is commanded in decoding processing of the video decoder, part of the inverse-quadrature-transformation/dequantization processing is skipped (see FIG. 4).

The invention is not limited to the above embodiments, and can be practiced so as to be modified in various manners without departing from the spirit and scope of the invention. And various inventions can be conceived by properly combining plural constituent elements disclosed in each embodiment. For example, several ones of the constituent elements of each embodiment may be omitted. Furthermore, constituent elements of different embodiments may be combined as appropriate.

The invention claimed is:

1. A moving picture decoding device for decoding a compression-coded video stream, comprising:
    an inverse-quadrature-transformation/dequantizer configured to perform inverse-quadrature-transformation/dequantization processing on each frame to be decoded;
    a load detector configured to detect a magnitude of an apparatus processing load including a processing load for decoding;
    a judging module configured to judge whether the magnitude of the apparatus processing load detected by the load detecting module is not smaller than a given value,
    wherein the controller skips at least part of the inverse-quadrature-transformation/dequantization processing based on whether or not inter-view prediction was used for a block currently being processed within the frame and further based on whether or not a reference picture of the block currently being processed is the same as a reference picture of a neighboring block.

2. The device of claim 1, wherein the controller skips the at least part of the inverse-quadrature-transformation/dequantization processing further based on a motion vector of the block currently being processed being the same as a motion vector of the neighboring block.

3. The device of claim 2, wherein the controller skips the at least part of the inverse-quadrature-transformation/dequantization processing further based on the neighboring block having no residual signal.

4. A moving picture decoding method for decoding a compression-coded video stream, comprising:
    detecting a magnitude of an apparatus processing load including a processing load for decoding by a processor;
    judging whether the magnitude of the apparatus processing load detected by the load detecting module is smaller than a given value; and
    performing a control so as to skip at least part of the inverse-quadrature-transformation/dequantization processing based on whether or not inter-view prediction was used for a block currently being processed within the frame and further based on whether or not a reference picture of the block currently being processed is the same as a reference picture of a neighboring block.

5. The method of claim 4, wherein the control is performed so as to skip the at least part of the inverse-quadrature-transformation/dequantization processing further based on a motion vector of the block currently being processed being the same as a motion vector of the neighboring block.

6. The method of claim 5, wherein the control is performed so as to skip the at least part of the inverse-quadrature-transformation/dequantization processing further based on the neighboring block having no residual signal.

7. An apparatus for decoding a compression-coded moving picture stream, comprising:
    a memory; and
    a data processor communicatively coupled to the memory, the data processor to (1) detect a magnitude of an apparatus processing load including a processing load for decoding, (2) judge whether the magnitude of the apparatus processing load is smaller than a given value, and (3) control a skip of at least part of the inverse-quadrature-transformation/dequantization processing based on whether or not inter-view prediction was used for a block currently being processed within the frame and further based on whether or not a reference picture of the block currently being processed is the same as a reference picture of a neighboring block.

8. The apparatus of claim 7, wherein the control of the skip of the at least part of the inverse-quadrature-transformation/dequantization processing is further based on a motion vector of the block currently being processed being the same as a motion vector of the neighboring block.

9. The apparatus of claim 8, wherein the control of the skip of the at least part of the inverse-quadrature-transformation/dequantization processing is further based on the neighboring block having no residual signal.

* * * * *